Inventor
C. Sauret Ponsa
By Glascock Downing Seebold
Attys.

United States Patent Office 3,071,250
Patented Jan. 1, 1963

1

3,071,250
APPARATUS FOR TREATING FEED-WATER BY THE ZEOLITE PROCESS
Carlos Sauret Ponsa, Mallorca 212, Barcelona, Spain
Filed Oct. 27, 1958, Ser. No. 769,773
Claims priority, application Spain Nov. 24, 1956
1 Claim. (Cl. 210—190)

This invention relates to an apparatus for treating feed-water by the zeolite process and this application is a continuation-in-part of United States patent application Serial Number 696,354, filed November 14, 1957, and now abandoned.

It is known that in feed-water treatment by the zeolite process the units containing zeolite go through three different stages: the water softening stage, in which the hard water is softened by passing through a zeolite filter bed; the regenerating stage, in which the sodium exhausted zeolite recovers its sodium by passing through it a strong solution of sodium chloride; and the washing stage, in which the chlorides resulting from the reactions of the regenerating stage are washed out of the zeolite.

A main object of the present invention is to provide an apparatus comprising in combination a plurality of units for treating feed-water by the zeolite process, the said units being interconnected to form simultaneously a circuit in the water softening stage, a circuit in the regenerating stage and a circuit in the washing stage, the three above circuits constituting a full cycle; means for feeding the three circuits; a distributor through which the said three circuits are interconnected, said distributor being adapted to cause, on operation, a simultaneous change in all circuits so that, at each operation of the distributor, the cycle starts with the unit following that with which it started before the operation; pumping means adapted to force water through the three circuits; and means adapted to operate automatically the said distributor at regular intervals.

It is a more specific object of the invention to obtain an apparatus of the type described having a distributor which comprises a stationary part provided with a plurality of ducts connected through suitable pipes to the said units and also connected to the inlet connections of hard water or of salted water or to the outlet connections of the three circuits, and a moving portion comprising a distributing plate free to turn having inner passages which connect one to another the ducts formed in the sationary part thus establishing the circuits constituting the cycle, the said distributing plate being adapted to be operated at regular intervals by suitable means causing at each operation a change in the circuits.

Another object of the invention is to obtain an apparatus of the type described provided with mechanical means adapted to operate automatically the distributor at regular intervals.

Another object of the invention is to construct an apparatus of the type described in which said mechanical means comprises a gear mechanism acting on a ring gear solidly connected to the distributing plate, said gear mechanism being put into operation by means of a ratchet mechanism which is periodically put into operation by means of mechanical means driven by a continuously running engine.

Another object of the invention is to obtain an apparatus of the type described in which the gear mechanism is put into operation by means of electrical means with intermittent discharge.

It is still another object of the invention to obtain an apparatus in which the feed-water and washing circuits are fed with hard water from a constant level reservoir which is fed from the general water piping, the said reservoir having partitions to still the water. The feed-water circuit is provided with a double reservoir adapted to receive the softened water, the said reservoir having an upper compartment into which runs the outlet pipe of the last water-softening unit and which is provided with two outlet pipes, one of the outlet pipes being exactly measured and running into a lower compartment and the other outlet pipe running on the sewer line. The regenerating circuit is provided with a reservoir for the preparation of the solution of sodium chloride formed with two compartments which are connected through a passage, one of the compartments having a grid placed below the level of the water in the compartment, the sodium chloride being placed on said grid, the water feeding the compartment running on to the sodium chloride placed on said grid, the other compartment having an outlet connection connected to the pumping means which force the water through the regenerating circuit. The water coming from the last unit in the regenerating circuit is led to the sewer line through a U pipe having a lower bend placed at a lower level than the bottom of the units.

It is still another object of the invention to obtain an apparatus having six units, two in each stage, the said units being regularly placed around the distributor.

The above and other objects of the invention will become apparent from the following detailed description of a preferred embodiment of the invention, in which reference is made to the accompanying drawings, in which.

Figures 1, 11, 12:
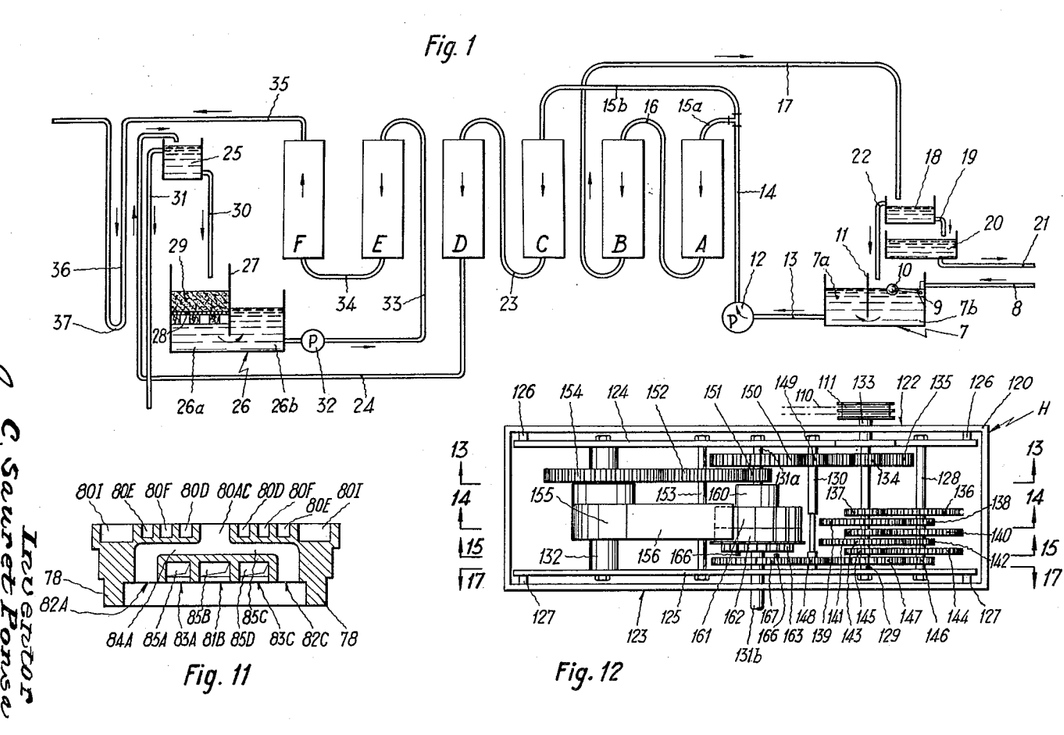
FIGURE 1 is a sketch showing the full cycle of the apparatus of the invention in a preferred embodiment having six units.
FIGURE 11 is a section of the distributing plate along line 11—11 of FIGURE 10.
FIGURE 12 is an enlarged plan view of the casing containing the means for operating the distributing plate after the cover has been removed.
Figure 4:
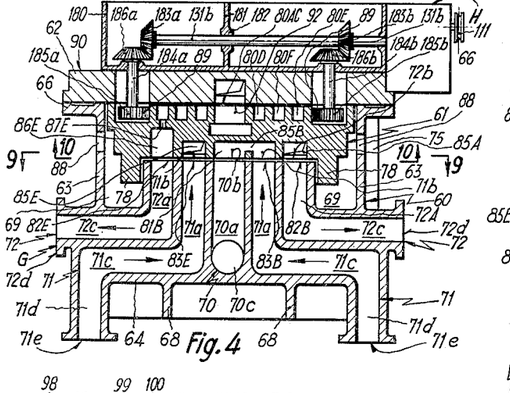
FIGURE 4 is a section along line 4—4 of FIGURE 3 in which all units have been removed.
Figure 5:
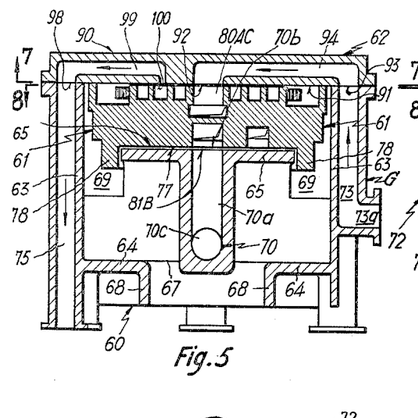
FIGURE 5 is a section along line 5—5 of FIGURE 3, in which the units and the means for the operation of the distributor at regular intervals have been removed.
Figure 18:
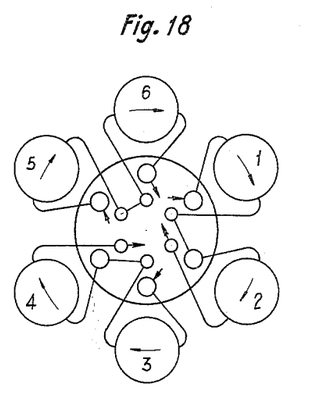
FIGURE 18 shows diagrammatically the apparatus of the invention in operation, the operating circuits being in the position shown in FIGURES 4 and 5.

With reference to FIGURE 1, A and B are two units in the water softening stage, C and D are two units in the washing stage and E and F are two units in the regenerating stage. With reference to FIGURES 4, 5 and 18, units 1 and 2 respectively are in phases A and B, units 3 and 4 respectively are in phases C and D, and units 5 and 6 respectively are in phases E and F.

The water softening circuit is fed from a reservoir 7, which contains hard water, reaching it from the general water piping through a pipe 8. The water in the reservoir 7 is maintained at a constant level due to a valve 9 controlled by a float 10, the said valve being placed at the outlet of the pipe 8. In the reservoir 7 there is a partition 11 which does not reach the bottom of the said reservoir and which divides the reservoir 7 into two compartments 7a and 7b: the water in compartment 7a is quiet and free from bubbling. A pump 12 draws the hard water from the reservoir 7 through a pipe 13 and pumps it through a piping 14 having a Y-branch 15a and 15b to units in phases A and C respectively. The water going through unit in phase A goes through a piping 16 to the unit in phase B, wherefrom the water, which has become softened flows through a pipe 17 to a reservoir 18. Reservoir 18 is provided with an exactly measured pipe 19 through which the softened water passes to reservoir 20 which feeds the boiler through a piping 21, to which a pump may be applied (not shown). When, through an excess of work of pump 12 there is an overflow of softened water the excess of softened water reverts to compartment 7b of reservoir 7 through a pipe 22, while the flow of softened water passing to reservoir 20 remains the same due to the fact that pipe 19 is exactly measured.

The washing circuit is fed through branch 15b and receives water pumped by the same pump 12. The water is forced through 15b, through unit in the washing phase C, through pipe 23, and through unit in washing phase D. The water with a content of washed-off remains of the regenerating process which comes out of the unit in phase D flows through pipe 24 to a reservoir 25.

The regenerating circuit is fed from a reservoir 26 containing a solution of sodium chloride. Reservoir 26 is formed with two compartments 26a and 26b separated by a partition 27 which does not reach the bottom so that in compartment 26b the water is quiet and free from bubbling. Compartment 26a has a grid 28 on which is placed crystallized sodium chloride 29, the said grid being mounted slightly below the water level in reservoir 26. A saturated solution of sodium chloride is thus maintained in reservoir 26. The reservoir 26 is fed from reservoir 25. The water with a small content of sodium chloride flows from reservoir 25 through an exactly measured pipe 30 on to the sodium chloride 29 placed on grid 28, becomes saturated and passes to reservoir 26. When there is an overflow of water in reservoir 25, the excess runs on the sewer line through 31. Obviously, reservoir 25 can also be fed from piping 14 before reaching the water softening and washing circuits. A pump 32 draws the salted water from reservoir 26 and pumps it through the regenerating circuit: through pipings 33 and 34 and through units in phases E and F. The solution of sodium chloride passes through unit in phase F in an opposite direction to that in which it has circulated through the unit in phase E. The outlet pipe 35 is formed with a U bend having a lower part 37 placed below the level of the bases of the units so that when the apparatus is not in operation the units in phases E and F remain full of salted water. The piping 35 runs on the sewer line.

The exactly measured pipes 19 and 30 provide an easy and constant control of the flow of feed water and of the degree of softening thereof. It will also be understood that the apparatus can comprise a number of units other than six according to preferences or to the needs of a particular plant.

Figure 2:
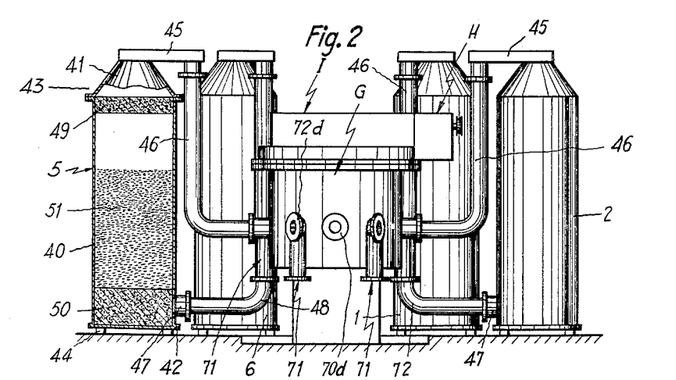
FIGURE 2 is a partial side view of the apparatus of the invention which shows four units, the remaining two units having been removed.
Figure 3:
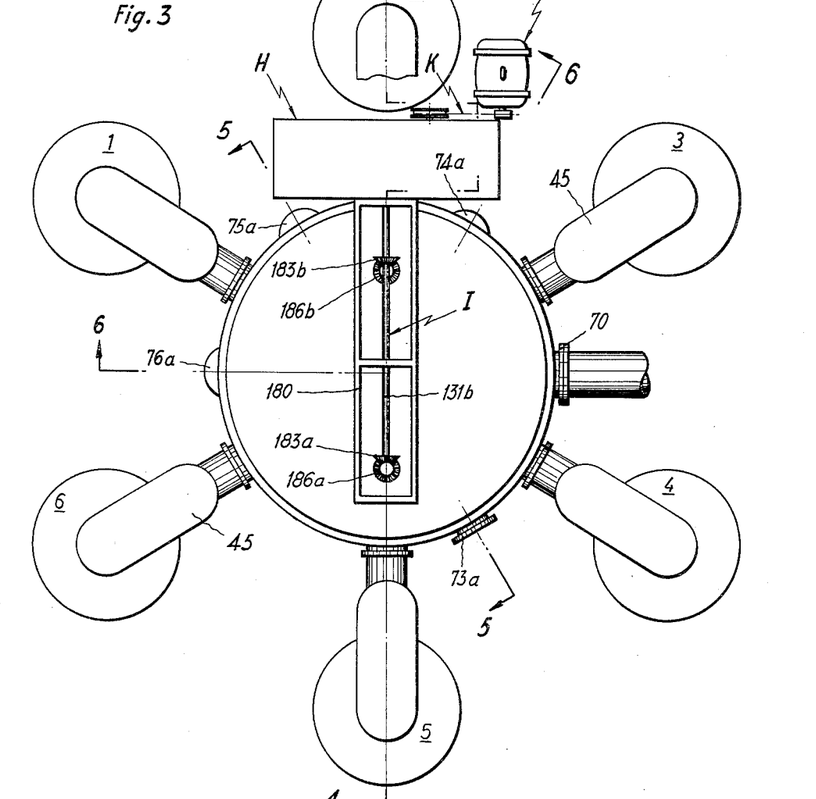
FIGURE 3 is a plan view of an embodiment of the apparatus of the invention showing the six units, the distributor and the means for the operation of said distributor at regular intervals.

In FIGURES 2 and 3 is shown a preferred embodiment of the present invention comprising: six units 1 to 6; a distributor G connecting the said units one to another and to reservoirs 7, 18, 25 and 26, so that at the same time two units are in the water softening circuit, two units are in the washing circuit and two units are in the regenerating circuit, the six units constituting a full cycle as described with reference to FIGURE 1; operating means H, which, through a gear mechanism I, periodically operates the distributor G thus automatically causing, on each operation, a simultaneous change in the circuits constituting the cycle so that, if before operation units 1—2—3—4—5—6 were in phases A—B—C—D—E—F respectively, after operation said units will be in phases

Figure 19:
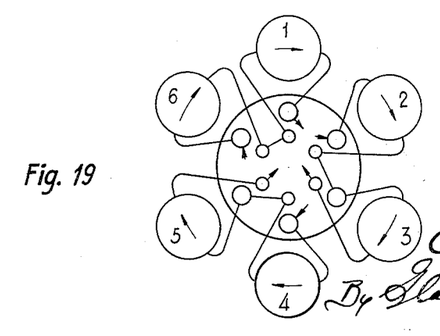
FIGURE 19 is a diagram similar to that of FIGURE 18 after the operation of the distirbuting plate has caused a change in the circuits, the cycle starting with the following unit to that with which it started in FIGURE 18.

F—A—B—C—D—E respectively, as shown diagrammatically in FIGURES 18 and 19, and, on each operation, a change in the same way will occur, until after the sixth operation the circuits will be established as initially; and an engine J imparting movement to the operating means H by means of conventional transmission means K.

Each unit comprises a tubular body 40 having upper and lower covers 41 and 42, which can be fixed to the body 40 by means of screws 43 or other suitable means. The lower cover 42 is provided with a conventional base 44. The upper cover 41 has a flanged connection 45 to which is fitted a pipe 46; connection 45 acts as an inlet when the corresponding unit is in any of phases A, B, C, D or E, and acts as an outlet when the unit is in phase F. The lower cover 42 has a flanged connection 47 to which is fitted a pipe 48; the connection 47 acts as an inlet when the corresponding unit is in phase F, and acts as an outlet when the unit is in any of phases A, B, C, D, or E. Pipes 46 and 48 connect units 1 to 6 to the distributor G. Within the body 40 there are an upper filter 49 and a lower filter 50, the zeolite 51 being placed between them. A substantially horizontal platform resting on units 1 to 6 may be provided (not shown), and the distributor may be placed thereon.

The distributor G comprises a substantially cylindrical stationary body 60 which is open by its upper part, a distributing plate 61 which is free to turn and is placed within said stationary body 60, and a stationary cover 62 on said body 60.

Figure 8:
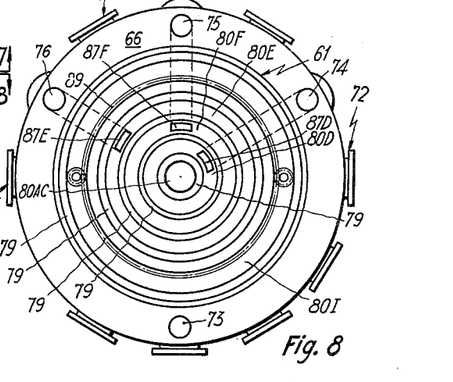
FIGURE 8 is a plan view of the distributing plate taken along line 8—8 of FIGURE 5.
Figure 9:
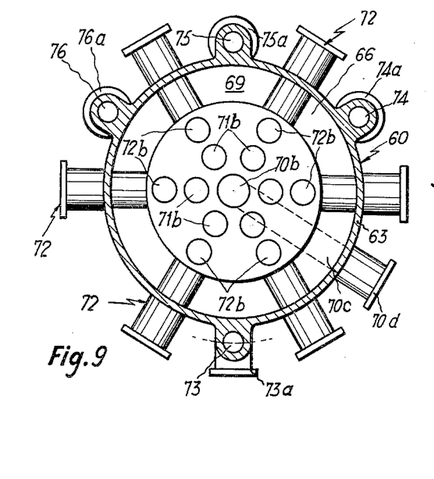
FIGURE 9 is a section of the distributor along line 9—9 of FIGURE 4.
Figure 10:
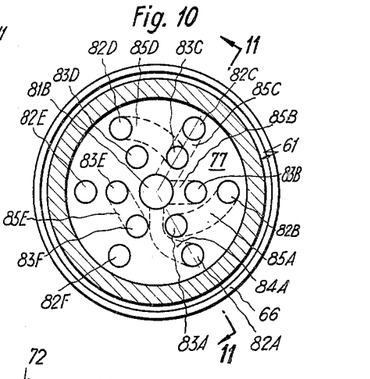
FIGURE 10 is a section of the distributor along line 10—10 of FIGURE 4.
Figure 13:
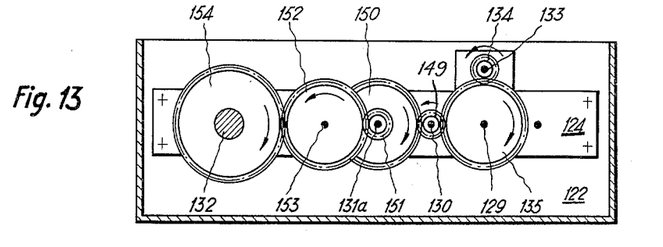
FIGURE 13 is a section along line 13—13 of FIGURE 12.

The stationary body 60 has a cylindrical outer wall 63, a bottom 64 and a flat inner platform 65. Around the upper edge of the body 60 there is an outwardly directed circular flange 66. The bottom wall 62 has a central hole 67 having on its edge a downwardly directed tubular extension 68. The inner platform 65 is placed at a lower level than the upper edge of the outer wall 63 and is separated from said outer wall by means of a circular channel 69. Between the inner platform 65 and the bottom 64 there are a plurality of bent ducts. A central duct 70 has an axial portion 70a centrally opening at its upper end 70b on to the inner platform 65 and a radial portion 70c which projects laterally beyond the outer wall 63 in a flanged outlet 70d connected to the piping 17 (see FIG. 1) through which the softened water from unit in phase B flows to the reservoir 18. A series of ducts 71 with a double bend are placed around the axial portion 70a of the central duct 70, each duct 71 having: a coaxial portion 71a opening at its upper end 71b on to the inner platform 65, the holes 71b being concentrically and symmetrically disposed around the central hole 70b (see FIG. 8); a radial portion 71c; and a coaxial end portion 71d externally attached to the outer wall 63, having a downwardly directed flanged hole 71e which is connected to the pipe 48 leading to the corresponding unit. Around the ducts 71 and on the same radial planes thereof there is a second series of bent ducts 72, each having: a coaxial portion 72a opening at its upper end 72b on to the platform 65, the holes 72b being concentrically and symmetrically disposed around the central hole 70b (see FIG. 8), and a radial portion 72c having an outwardly directed flanged hole 72d laterally projecting from the outer wall 63, the said hole being connected to the pipe 46 leading to the corresponding unit. Externally to the outer wall 63 and attached thereto there are four coaxial ducts 73—74—75—76 going through the outer flange 66 by their upper ends. The duct 73 has a flanged inlet 73a which projects laterally and is connected to the pipe 14 through which the hard water from reservoir 7 is forced by means of pump 12 (see FIG. 1). The duct 74 has a downwardly projecting flanged inlet 74a connected to pipe 24 through which flows the water from the unit in phase D. The duct 75 is diametrically opposed to duct 73 and, through the downwardly projecting flanged inlet 75a, is connected to the piping 35 through which the water from the unit in phase F runs on the sewer line. The duct 76, through a downwardly projecting flanged inlet 76a, is connected to the pipe 36 through which the saturated solution of sodium chloride from reservoir 26 is forced by means of pump 32.

The distributing plate 61 has a circular shape. Its under surface 77 is flat and has the same dimensions as the inner platform 65 of the stationary body 60. All around the under surface 77 the distributing plate is provided with a downwardly directed circular projection 78 which is set in the circular channel 69 and is adapted to guide the distributing plate 61 on the inner platform 65 so that the said plate 61 can turn freely thereon without having lateral play. The height of the distributing plate is such that the upper surface 79 is exactly at the same level as the upper edge of the stationary body 60 and its flange 66. On the said upper surface there are an axial orifice 80AC, which does not pass through the plate 61, and four concentrical circular channels 80D, 80F, 80E and 80I, the outer channel 80I being wider than the other three, while channels 80D, 80F and 80E have the same width. On its under surface there is an axial orifice 81B which coincides with the hole 70b of the duct 70 in the stationary body 60, the orifice 81B is a geometrical continuation of the axial orifice 80AC but is not in connection with it. On the under surface of the distributing plate 62 there are two concentrical series of holes 82A–82F and 83A–83F coinciding respectively with the series of holes 72b and 71b of ducts 72 and 71 of the stationary body 60 and they are connected as follows. The hole 82A is connected through an inner passage 84A with the orifice 80AC in the upper surface 79 of the distributing plate 61, the said hole 82A coinciding with one of the holes 72b in the stationary body 60, which in the position of the distributing plate shown in FIGURES 4, 5 and 18 is the hole connected with unit 1. The hole 83A coincides with the next hole of the series 71b, which in the above mentioned position of the plate 61 is the hole connected with unit 1, the hole 83A being in communication with the hole 82B through an inner passage 85A, the said hole 82A communicating also with the next hole of the series 71b, which in the above mentioned position of the plate 61 is the hole in connection with unit 2. The hole 83B is connected through an inner passage 85B with the axial orifice 81B and the said hole 83B coincides with a hole of the series 71b, which in the said position of the plate 61 is the hole connected with unit 2. An inner passage 85C connects as well the upper axial orifice 80AC with the hole 82C, which coincides with a hole of the series 72b, which in the said position of the plate 61 is a hole connected with unit 3. The hole 83C, which coincides with a hole of the series 71b (said hole being in the said position of the distributing plate 61 the hole connected with unit 3), communicates through the inner passage 85D with a hole 82D, which coincides with a hole of the series 72b, which in the above mentioned position is the hole connected with unit 4. The hole 83D coincides with a hole of the series 71b, which in the said position of the distributing plate 61 is the hole connected with the unit 4, and the said hole 83D communicates, through an inner passage 86D passing through the plate 61 in a substantially coaxial direction, with the hole 87D in the bottom of the circular channel 80D. The hole 82E coincides with a hole of the series 72b, which in the said position is the hole connected with unit 5, and, through an inner passage 86E passing through the plate 61, communicates with a hole 87E in the bottom of the circular channel 80E. The hole 83E coincides with a hole of the series 71b, which in the said position of the plate 61 is the hole connected with unit 5, and communicates, through the inner passage 85E, with the hole 83F, which coincides with a hole of the series 71b, which in the said position of the plate 61 is the hole connected with unit 6. Finally, the hole 82F coincides with a hole of the series 72b, which in the said position of the plate 61 is the hole connected with unit 6, and communicates, through an inner passage 86F passing through the plate 61, with a hole 87F in the bottom of the circular channel 80F. Through openings 88 cut out in the outer wall 63 and facing each unit, it is possible to read from the exterior a reference to the phase of the corresponding unit, the said references to each phase being applied to the outer side face of the distributing plate 61. A ring gear 89 is solidly attached to the inner side of channel 80I. For the sake of clearness the distributing plate 61 has been shown in the drawings in one piece. However, from a manufacturing and/or operative point of view, it may be desirable to make the plate 61 in several pieces connected by means of suitable joints. It is advisable to make the surfaces which are subject to friction of a suitable material such as brass.

The stationary cover 62 has a circular shape and the same diameter as the outer flange 66 to which it is secured by conventional means (not shown). Said cover 62 has a flat upper surface 90 and a flat under surface 91. The said under surface 91 has: a central orifice 92 which coincides with the orifice 80AC of the distributing plate 61; a hole 93 near its periphery which coincides with the upper hole of the duct 73 and is connected by means of an inner passage 94 with said central orifice 92; a hole 95 also placed near its periphery and coinciding with the upper hole of the duct 74, the said hole 95 communicating through an inner passage 96 with a hole 97 on the same radius as the hole 95 and the passage 96, the said hole 97 facing the channel 80D of the distributing plate 61; a hole 98 also placed near the periphery of the under surface 91 of cover 62 and coinciding with the upper hole of the duct 75, the said hole 98 being connected through an inner passage 99 with a hole 100 placed on the same radius as the hole 98 and the passage 99, the said hole 100 facing the channel 80F of the distributing plate 61; another hole 101 near its periphery, which coincides with the upper hole of the duct 76 and communicates through an inner passage 102 with a hole 103 placed on the same radius as the hole 101 and the passage 102, the said hole 103 facing the channel 80E of the distributing plate 61. Passages 94, 96, 99 and 102 have thus two outlets each, all outlets being in the under face 91 of the cover 62. In the cover 62 there are also two openings 104a and 104b which pass through it from its upper surface to its under surface, each of which opens out in front of one of two diametrically opposed points of the circular channel 80I.

Assuming that the distributing plate remains in the position shown in FIGURES 4, 5, and 18, the full cycle of the apparatus is established through the distributor G as follows. The hard water from the reservoir 7 forced by the pump 12 through piping 14 gets into the distributor through inlet 73a, and proceeds through duct 73, hole 93, passage 94 and orifice 92 to the upper central orifice 80AC of the distributing plate 61 (see FIG. 5). From 80AC the hard water takes two paths (see FIG. 11): one which, through branch 84A, follows the water softening process through units in phases A and B, and the other which, through branch 85C, passes through units in phases C and D of the washing process. The water which penetrates through 84A flows through 82A, 72b, 72a, 72d, 46 and 45 to unit 1 in water softening phase. That path corresponds to the branch 15a of the sketch shown in FIG. 1. Within unit 1 the water goes through the filter 49 and the zeolite 51, where it is treated, and follows through filter 50 and connection 47 out to the pipe 48 leading to the distributor G through hole 71e. Within the distributor, the partially treated water proceeds through portions 71d, 71c and 71a and hole 71b of duct 71 in the stationary body 60, and through hole 83A, inner passage 84A and hole 82B of the distributing plate 61, wherefrom it passes to unit 2 in phase B through the communication established by means of 72b, 72a, 72c, 72d, 46, 45 and 49. The partially treated water passes through the zeolite 51 of unit 2 in phase B in the same direction as it has passed through unit 1 in phase A and the fully treated, softened water flows through 47, 48, into the stationary body through 71e, 71d, 71c, 71a and 71b, and proceeds to the distributing plate 61 through 83B, 85B and 81B, then back to the stationary body 60 through 70b, 70a, 70c, and, through the outlet 70d, out to the piping 17 running into the reservoir 18.

Figure 6:
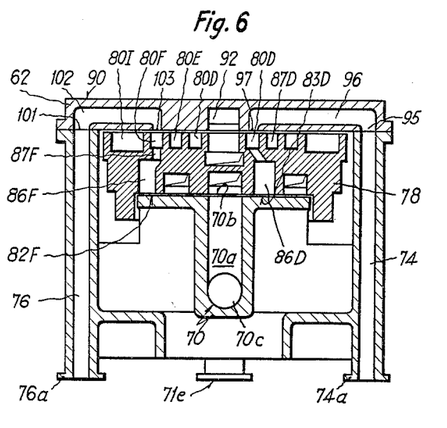
FIGURE 6 is a similar section to that of FIGURE 5 along line 6—6 of FIGURE 3.
Figure 7:
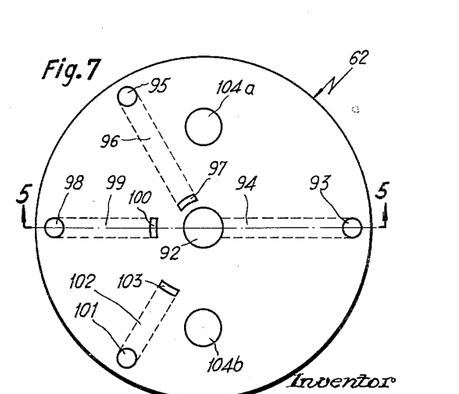
FIGURE 7 is a bottom view of the distributor cover taken along line 7—7 of FIGURE 5.

The hard water which has followed the other path through 85C, flows through hole 82C and through the communication established by means of 72b, 72a, 72d, 46, 45, and 49 (which is the same as branch 15b in FIG. 1) into unit 3 in phase C, where it washes the regenerated zeolite 51 in said unit and goes out through 47 and 48, and then again into the distributor G through hole 71e. Within the distributor the water proceeds through 71d, 71c, 71a and 71b of the stationary body 60, keeps on through hole 83C, inner passage 85D and hole 82D of the distributing plate and flows to unit 4 in phase D through the communication established by means of 72b, 72a, 72c, 72d, 46 and 45 (which is the same as piping 23 in FIG. 1). The water passes through the zeolite 51 of unit 4 in phase D in the same direction as it has passed through unit 3 in phase C and the washing of the zeolite is thus accomplished. The slightly salted water flows through 47 and 48 out of the unit 4, and through 71e into the distributor again, wherein it comes up the stationary body 60 through 71d, 71c, 71a and 71b, into the distributing plate through 83D, 86D, 87D, through the circular channel 80D (see FIGS. 6 and 8), into the cover through 97, 96 and 95, down the stationary body again through 74 and out of the distributor through the outlet 74a connected to the piping 24 through which the water runs into the reservoir 25 (FIG. 1).

The pump 35 forces the salted water from reservoir 26 through piping 36 connected to the inlet 76a of duct 76 attached to the stationary body 60 of the distributor G. The salted water proceeds through hole 101, inner passage 102 and hole 103 in the cover 62, and down the circular channel 80E of the distributing plate 61. From 80E the water continues through the hole 87E, the inner passage 86E and the hole 82E of the distributing plate 61, and through the communication established by means of 72b, 72a, 72c, 72d, 46 and 45 (which corresponds to piping 34 of FIG. 1) it flows to unit 5 in phase E of the regenerating process. Within unit 5 the salted water goes through the zeolite 51 which receives then a first treatment and through 50, 47 and 48 back to the distributor. The salted water penetrates into the distributor through 71e, and goes up the stationary body through 71d, 71c, 71a and 71b, into the distributing plate through 83E, 85E and 83F, and down the stationary body again through 71b, 71a, 71c, 71d and 71e, so that the salted water flows to the unit 6 in phase F through 48 and 47. The said water goes through the zeolite 51 of unit 6 in phase F in the opposite direction to that in which it has passed through unit 5 in phase E and goes out through 45 to 46. It flows to the distributor through hole 72d, goes up the stationary body through 72c, 72a and 72b, it crosses the distributing plate 61 through 82F, 86F and 87F, thus reaching the circular channel 80F, wherefrom, through the communication established by means of hole 100, passage 99 and hole 98 in the cover 62, the water reverts to the stationary body and through duct 75 and outlet 75a flows to the piping 35—37—36 and runs on the sewer line.

The cycle which has just been described has been sketched in FIGURE 18. When the distributing plate turns an angle of 60° the circuits of the cycle become those shown in FIGURE 19. Each such movement of the distributing plate changes the circuits in the same way and after the sixth movement, i.e. after the distributing plate has made a full 360° turn, the circuits established are again those shown in FIGURE 18. So, on each full turn of the distributing plate the units have successively gone through each of phases A, F, E, D, C, and B. Therefore, by giving automatically a 60° turn to the distributing plate at the end of each period as it may be found suitable, an apparatus will be obtained which will work continuously and independently.

In order to cause the distributing plate to turn at regular intervals, mechanical means have been provided, such means comprising: an engine J imparting a continuous rotating movement to a shaft, transmission means K for transmitting the said continuous rotating movement to operating means H which convert the said continuous movement into a periodical operation, and a gear mechanism I which transmits the said periodical operation to the distributing plate 61 of the distributor G. The above parts have been shown in FIGURES 3, 4, and 12 to 17.

The engine J can be any suitable engine of a conventional type making the desired number of revolutions. A transmitting belt 110 transmits the same number of revolutions to a wheel 111.

The means H for periodically operating the distributing plate 61 are set in a casing 120 having a cover 121. To the side walls of greater extension 122 and 123 two parallel plates 124 and 125 have been fixed by suitable conventional means 126 and 127. Resting on the two parallel plates 124 and 125, five shafts 128, 129, 130, 131 (in two parts 131a and 131b) and 132 have been mounted, all being in the same horizontal plane. In a plane perpendicular to the said horizontal plane and parallel thereto there is a shaft 133 passing through wall 122 of the casing 120, the said shaft 133 being solidly connected by its outer end to the wheel 111 of transmission means K and by its inner end to a gear wheel 134. A speed reducer is mounted on said shafts 128 and 129, the said speed reducer comprising idler gear wheels 135 to 147. The gear wheel 135 engages the gear wheel 134 and is connected to gear wheels 137. Gear wheels 136, 139, 140, 143 and 144, are respectively connected to gear wheels 138, 141, 142, 145 and 146, and gear wheels 137, 139, 141, 143, 145 and 147 respectively engage gear wheels 136, 138, 140, 142, 144 and 146. The gear wheel 147 also engages the idler gear wheel 148 mounted on shaft 130. On the other hand, gear wheel 135 engages the idler gear wheel 149 mounted on shaft 130, the said gear wheel 149 engaging also the gear wheel 150 connected to gear wheel 151, both gear wheels 150 and 151 running loose on the stationary portion 131a of the shaft 131. From wheel 135 to wheel 151 a reasonable speed reduction is obtained. A gear wheel 152 running loose on shaft 153 engages both gear wheel 151 and gear wheel 154 locked to the shaft 132, the said shaft 132 being freely mounted on plates 124 and 125. An eccentric 155 is also mounted on the shaft 132, the said eccentric imparting to the trigger 156 a back-and-forth motion which depends on the rotation of shaft 132. Within part 160, the shaft 131 is split into two portions 131a and 131b both having the same geometrical axis. However, portion 131a is fixed to the plate 124, whereas the shaft portion 131b is freely mounted on plate 125 and, through wall 123, it extends inside the casing which contains the gear mechanism I.

The shaft 131b is locked to a ratchet wheel 161, whereas a ratchet wheel 162 and a gear 163, locked to one another, are running loose on said shaft 131b. The teeth of ratchet wheel 162 are identical with the teeth of ratchet wheel 161 but the distance from the smooth zone 164 of the ratchet wheel 162 to the shaft axis is greater than the distance from the ends of the teeth to said shaft axis. The width of trigger 156 is approximately equal to that of both ratchet wheels 161 and 162 together, the said ratchet wheels being adjacent to each other so that when the end 157 of the trigger 156 moves down by its own weight it bears on both ratchet wheels, if the ratchet wheel 162 offers it the toothed zone (see FIG. 16), and it bears only on ratchet wheel 162 if it is offered the smooth zone 164, having a small recess 165. The gear 163 is provided with an outwardly directed small projection 166. An idler gear wheel 167 is mounted on the shaft 131b, the said gear wheel 167 engaging the gear wheel 148 and having an inwardly directed small projection 168 which is adapted to come into contact with the projection 166 of the gear 143. A downwardly directed pin 169 resiliently mounted in the hollow body 170 (see FIGS. 15 and 16) engages with its lower end the gear 163 and keeps the said gear stationary unless the said gear receives a pressure in the direction of the arrow (FIGS. 15 and 16) in which case it retracts against the action of its own resilient means (not shown).

The gear mechanism I is housed inside the casing 180, which is attached to the cover 62 of the distributor G. In the central part of the casing 180 there is a transverse partition 181 having a hole provided all round with a reinforcing ring 182 which rests on the shaft 131b which crosses lengthwise the said casing 180. Two bevel pinions 183a and 183b are fastened to the shaft 131b. Coinciding with the two openings 104a and 104b of the cover 62, there are two holes in the bottom of casing 180. Two vertical shafts 184a and 184b pass through the said holes. To the lower ends of shafts 184a and 184b which are introduced within the circular channel 80I of the distributing plate, are solidly connected the gear wheels 185a and 185b which engage the gear ring 89 of the distributing plate 61. The number of teeth of gear wheels 185a and 185b is exactly one sixth of the wheels of gear ring 89 so that each full turn of the gear wheels 185a and 185b causes the distributing plate to turn 60°. Fastened to their upper ends the shafts 184a and 184b have two bevel pinions 186a and 186b, the said bevel pinions 186a and 186b engaging the bevel pinions 183a and 183b.

The mechanisms described above work as follows. The revolutions generated by engine J are transmitted to the wheel 111 by means of the transmitting belt 110 and transmitted by means of shaft 133 from wheel 111 to gear wheel 134 which transmits the rotary motion, with some speed reduction, to shaft 132 by means of gearing 135—149—150—151—152—154. The rotary motion of shaft 132 is transformed into a back-and-forth motion by means of the eccentric 155 carrying the trigger 156 of the ratchet mechanism. In the position of said ratchet mechanism shown in FIGURES 14 and 15, the back and forth motion of trigger 156 is inoperative since the end 157 bears on the smooth zone 164. The pin 169 acting on the gear 163 prevents the ratchet wheel 162 from occasional turning produced by friction of the end 157 on the smooth zone 164, since gear 163 is fastened to ratchet wheel 162. Furthermore, the end 157 is in a lifted position which is sufficient to prevent its engaging the ratchet wheel 161, which remains stationary.

Figure 14:
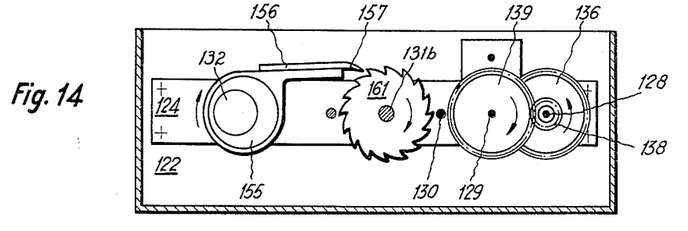
FIGURE 14 is a section along line 14—14 of FIGURE 12 showing the trigger in an inoperative position.
Figure 15:
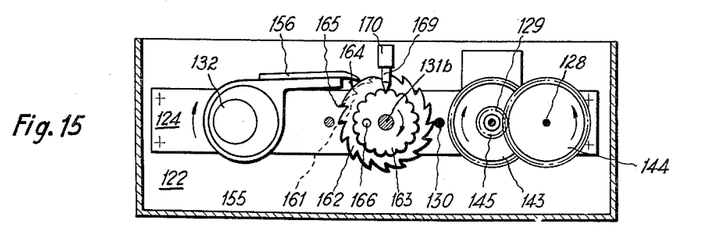
FIGURE 15 is a section along line 15—15 of FIGURE 12 showing the trigger in an inoperative position.
Figure 16:
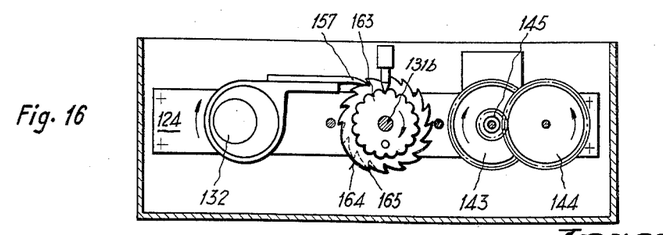
FIGURE 16 is a similar section to that of FIGURE 15 showing the trigger in an operative position.
Figure 17:
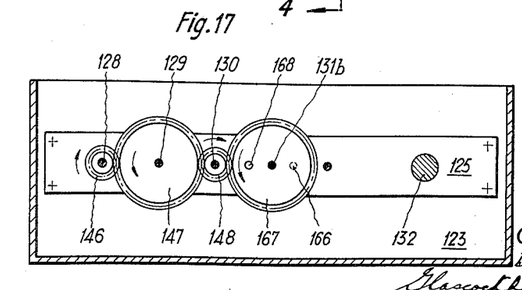
FIGURE 17 is a section along line 17—17 of FIGURE 12.

On the other hand, the rotating motion of the gear wheel 135 is transmitted through the speed reducer 136—148 to the gear wheel 167, the gear ratio being such that in order to complete a full turn it takes to the said wheel 167 exactly the time chosen as the interval between two operations of the distributing plate. Immediately after an operation of the distributing plate, the projection 168 of the gear wheel 167 is in a position just ahead of the projection 166 of the gear 163. As the gear wheel 167 turns as shown by the arrow, the projection 168 follows a circular path, so that, when the gear wheel has turned 180°, the projection 168 is in approximately the position shown in FIG. 17 and when the gear wheel has given a full turn the projection 168 engages the projection 166 of gear 163. As the gear wheel 167 keeps on turning the projection 166 is pushed forward and the gear 163 turns in the direction of the arrow and overcomes the resistance of pin 169, the ratchet wheel 162 turning at the same time. The smooth zone 164 of the ratchet wheel 162 turns slowly until the end 157 of the trigger 156 engages the recess 165 in its forward motion and pushes it forward placing at the same time the first tooth of the ratchet wheel 162 exactly side by side of a tooth of the ratchet wheel 161. Then the end 157 moves back in its back-and-forth motion and drops on the next tooth of both ratchet wheels 161 and 162, and in the next forward movement the said end 157 engages a tooth of each ratchet wheel and pushes both forward thus making the ratchet wheels 161 and 162 turn the width of one tooth (see FIG. 16). As long as the trigger 156 is in its operative position, each forward movement thereof makes the ratchet wheels 161 and 162 turn the same angle, the said rotating movement being also imparted to the shaft 131b which is fastened to ratchet wheel 161. After the ratchet wheel 162 has turned 360° from the moment the two projections 166 and 168 have come into contact, the end 157 of the trigger 156 bears again on the smooth zone 164 and is lifted again as shown in FIGS. 14 and 15. The ratchet wheel 161 again becomes stationary until the next operation. Since the speed reduction ratio from gear wheel 135 to shaft 132 is much less than the speed reduction ratio from the gear wheel 136 to the gear wheel 167, while it takes the full period between two operations for the gear wheel 167 to turn a 360° angle, the turning movement of the ratchet wheel 161 during each operation is effected in a few seconds, the said movement of the ratchet wheel 131 being transmitted to the shaft 131b and, through the gear mechanism I, to the gear wheels 185a and 185b which engage the gear ring 89 of the distributing plate. Now, the ratchet wheel 161 does not make a full 360° turn but only one of 270° since the trigger 156 only engages the ratchet wheel 161 as long as it engages the toothed zone of the ratchet wheel 162, the said toothed zone of the wheel 162 having twelve teeth only. Therefore, on each operation of the ratchet wheel 161 the shaft 131b turns an angle of 270°. In order to obtain a 60° turn of the distributing plate at each operation, the bevel pinions 186a and 186b must have a number of teeth equal to three quarters the number of teeth of the bevel pinions 183a and 183b. A 270° turn of the shaft 131b thus causes a full turn of bevel pinions 186a and 186b and, consequently, of gear wheels 185b. Generally speaking, the gear ratio from shaft 131b to gear ring 89 must be inversely proportional to the gear ratio from ratchet wheel 161 to shaft 131b, which can be obtained in a number of conventional ways apart from the way shown in the present specification.

Consequently, it is enough to put on a conventional switch (not shown) connected to the engine J and to pumps 12 and 35, to make the apparatus of the invention work automatically with a change of the circuits, at each chosen interval, until the said conventional switch is put off again. A continuous working of the apparatus for treating feed-water by the zeolite process in thus obtained.

It is pointed out that the periodical operation of the distributing plate 61 can also be obtained by means of electrical means with intermittent discharge connected to an engine driving the shaft 131b, either by direct transmission or by means of a suitable speed reducer. In that case an independent switch must be connected to pumps 12 and 35. The number of water softening units of the apparatus can also be modified, according to the wishes, or to the needs of a particular plant, without other changes, in respect of the embodiment described above, then those obvious to any one skilled in the art.

What I claim is:

In an apparatus for softening water by the use of zeolite, a plurality of at least three units each containing zeolite, each said unit having two-pipe connections, one for introducing hard water into said unit, the other to remove softened water from said unit, a source of hard water and a source of salt water, a distributor comprising a stationary body and cover, and a rotatable distributor plate engaging said body on one side and said cover on the other, said stationary body and cover being provided with axial passages, one on each side of said rotatable distributor plate, one said axial passage being a supply passage for hard water, the other said axial passage being a discharge passage for soft water, said stationary body also including a salt water supply passage eccentric to said rotatable distributor plate, a second eccentric discharge passage for spent salt water after being used for zeolite regeneration, and a third eccentric passage for transfer of hard water, used to wash the regenerated zeolite, to the source of salt water, means to rotate said rotatable distributor plate, a set of passage means for each said unit in said distributor body having open ends facing said rotatable distributor plate, passages in said rotatable distributor plate and in said cover such that in any rotated position of said rotatable distributor plate at least one said unit is connected to said supply passage for hard water and to said discharge passage for soft water, one said unit is connected to said salt water supply passage and to said discharge passage for spent salt water, and one said unit is connected to said supply passage for hard water and to said third eccentric passage, whereby said units will be successively positioned to soften water, have the zeolite regenerated and have the salt residue washed out and the salt residue and the wash water used as a base for the salt water for regeneration of the following units.

References Cited in the file of this patent

UNITED STATES PATENTS

| | | |
|---|---|---|
| Re. 18,909 | Turner | Aug. 1, 1933 |
| 1,772,134 | Dunbar | Aug. 5, 1930 |
| 1,938,628 | Huppertz | Dec. 12, 1933 |

FOREIGN PATENTS

| | | |
|---|---|---|
| 773,724 | Great Britain | May 1, 1957 |